(12) United States Patent
Yoon et al.

(10) Patent No.: US 11,438,612 B2
(45) Date of Patent: Sep. 6, 2022

(54) DISPLAY DEVICE AND CONTROL METHOD THEREOF

(71) Applicant: SAMSUNG ELECTRONICS CO., LTD., Suwon-si (KR)

(72) Inventors: Seok-hyun Yoon, Suwon-si (KR); Yong-sik Kwon, Suwon-si (KR); Ki-bo Kim, Hwaseong-si (KR); Se-jun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/957,632

(22) PCT Filed: Aug. 6, 2018

(86) PCT No.: PCT/KR2018/008878
§ 371 (c)(1),
(2) Date: Jun. 24, 2020

(87) PCT Pub. No.: WO2019/132152
PCT Pub. Date: Jul. 4, 2019

(65) Prior Publication Data
US 2021/0058631 A1 Feb. 25, 2021

(30) Foreign Application Priority Data
Dec. 27, 2017 (KR) .................. 10-2017-0180365

(51) Int. Cl.
*H04N 19/40* (2014.01)
*H04N 19/103* (2014.01)
(Continued)

(52) U.S. Cl.
CPC ........... *H04N 19/40* (2014.11); *H04N 19/103* (2014.11); *H04N 19/136* (2014.11); *H04N 19/176* (2014.11); *H04N 19/65* (2014.11)

(58) Field of Classification Search
CPC .... H04N 19/136; H04N 19/176; H04N 19/40; H04N 19/103; H04N 19/65; G09G 5/00
See application file for complete search history.

(56) References Cited

U.S. PATENT DOCUMENTS

| 2002/0048323 A1 | 4/2002 | Kang et al. |
| 2002/0106018 A1* | 8/2002 | D'Luna ............... H04N 21/434 |
| | | 375/240.01 |

(Continued)

FOREIGN PATENT DOCUMENTS

| KR | 10-2002-0032020 A | 5/2002 |
| KR | 10-2008-0080872 A | 9/2008 |

(Continued)

OTHER PUBLICATIONS

International Search Report (PCT/ISA/210) dated Nov. 19, 2018, issued by the International Searching Authority in International Application No. PCT/KR2018/008878.

(Continued)

*Primary Examiner* — Neil R Mikeska
(74) *Attorney, Agent, or Firm* — Sughrue Mion, PLLC

(57) ABSTRACT

The disclosure relates a display apparatus comprising: a signal input receiver receives a plurality of signals which are different in kind from each other, a plurality of encoders provided respectively corresponding to the plurality of signals, and perform encoding of a corresponding mode according to the kinds of at least one signal input to the signal input receiver among the plurality of signals, a first interface transmits a signal obtained by serializing the encoded signal, a second interface deserializes the signal received from the first interface, a plurality of decoders provided respectively corresponding to the plurality of encoders, and perform decoding and restoring the deserialized signal into the at (Continued)

least one signal, and a display displays an image based on the at least one restored signal.

20 Claims, 7 Drawing Sheets

(51) Int. Cl.
*H04N 19/136* (2014.01)
*H04N 19/176* (2014.01)
*H04N 19/65* (2014.01)

(56) References Cited

U.S. PATENT DOCUMENTS

| | | | | |
|---|---|---|---|---|
| 2005/0251726 | A1* | 11/2005 | Takamura | H03M 13/276 714/755 |
| 2005/0271072 | A1* | 12/2005 | Anderson | H04L 29/06027 370/419 |
| 2006/0153572 | A1 | 7/2006 | Champion et al. | |
| 2008/0109707 | A1 | 5/2008 | Dell et al. | |
| 2008/0215949 | A1 | 9/2008 | Shin | |
| 2009/0024756 | A1* | 1/2009 | Spalla | H04L 1/0057 709/231 |
| 2009/0207861 | A1* | 8/2009 | Iannuzzelli | H04H 20/30 370/476 |
| 2010/0231803 | A1* | 9/2010 | Citta | H04L 1/0028 348/723 |
| 2010/0241931 | A1* | 9/2010 | Choi | H03M 13/2915 714/776 |
| 2011/0135039 | A1* | 6/2011 | Limberg | H04N 21/2383 375/340 |
| 2011/0305443 | A1* | 12/2011 | Sasaki | H04N 13/194 386/357 |
| 2012/0005560 | A1* | 1/2012 | Steiner | H03M 13/2927 714/780 |
| 2012/0033034 | A1* | 2/2012 | Otsuka | H04N 13/161 348/42 |
| 2012/0056985 | A1 | 3/2012 | Jeong et al. | |
| 2013/0124931 | A1 | 5/2013 | Chen | |
| 2013/0148768 | A1* | 6/2013 | Kim | H04L 7/005 375/354 |
| 2014/0119459 | A1* | 5/2014 | Kumar | H04N 19/89 375/240.27 |
| 2016/0021430 | A1* | 1/2016 | LaBosco | H04N 21/4367 725/31 |
| 2016/0358527 | A1 | 12/2016 | Bae et al. | |
| 2019/0087794 | A1* | 3/2019 | Cho | G06F 8/65 |
| 2020/0411021 | A1* | 12/2020 | Hamada | H04L 67/06 |

FOREIGN PATENT DOCUMENTS

| | | |
|---|---|---|
| KR | 10-2010-0048811 A | 5/2010 |
| KR | 10-2012-0025306 A | 3/2012 |
| KR | 10-1211891 B1 | 12/2012 |
| KR | 1020150084564 A | 7/2015 |

OTHER PUBLICATIONS

Communication dated Mar. 22, 2022 issued by the Korean Intellectual Property Office in Korean English Application No. 10-2017-0180365.

\* cited by examiner

DISPLAY DEVICE AND CONTROL METHOD THEREOF

TECHNICAL FIELD

The disclosure relates to a display apparatus and a method of controlling the same.

BACKGROUND ART

A display apparatus employs a high-speed interface system to transmit a signal between a chip and a chip or between a device and a device. By using the high-speed interface system, signals which are input through a plurality of physical transmission lines can be transmitted through one or fewer physical transmission lines.

In particular, the high-speed interface system can support integrated connection for a plurality of peripheral devices, and enable a control signal and a data signal including video or graphic data received from the peripheral devices to be integrated and transmitted to the display apparatus through one or fewer transmission lines, and therefore the high-speed interface system has been used in various fields.

The high-speed interface system may have a transmission error caused by various factors such as cable channel conditions at connection between devices, signal loss during signal transmission, electromagnetic interference (EMI), ambient temperature, etc. To prevent this error, a forward error correction (FEC) technique has been introduced, so that a signal can be restored at a receiving terminal when the transmission error occurs.

However, batch application of the FEC without considering characteristics of signals may rather cause problems of lowering stability of a signal and resulting in an erroneous correction of a signal.

Technical Problem

Accordingly, an aspect of the disclosure is to provide a display apparatus and a method of controlling the same, in which a forward error correction (FEC) technique is applied corresponding to characteristics of signals, thereby guaranteeing stability of a signal and preventing an erroneous correction of a signal.

Technical Solution

According to an embodiment of the disclosure, there is provided a display apparatus comprising: a signal input receiver configured to receive a plurality of signals which are different in kind from each other; a plurality of encoders provided respectively corresponding to the plurality of signals, and configured to perform encoding of a corresponding mode according to the kinds of at least one signal input to the signal input receiver among the plurality of signals; a first interface configured to transmit a signal obtained by serializing the encoded signal; a second interface configured to deserialize the signal received from the first interface; a plurality of decoders provided respectively corresponding to the plurality of encoders, and configured to perform decoding and restoring the deserialized signal into the at least one signal; and a display configured to display an image based on the at least one restored signal.

The plurality of signals comprises a first signal comprising packet-type data, and a second signal comprising serial-type data, and the plurality of encoders comprises a first encoder configured to perform encoding based on a first mode having a first error correction capacity with respect to the first signal, and a second encoder configured to perform encoding based on a second mode having a second error correction capacity lower than the first error correction capacity with respect to the second signal.

Further comprising a packetizer provided between the signal input receiver and the first encoder, and configured to rearrange data of the first signal to correspond to the first mode of the first encoder.

The first signal comprises a sync signal, and the packetizer allows the rearranged data of the first signal to comprise sync information to indicate a position of the sync signal.

The first interface comprises a merger configured to output one merged signal into which the first signal encoded by the first mode of the first encoder and the second signal encoded by the second mode of the second encoder are merged.

The second encoder outputs encoded data in units of blocks having the number of bits corresponding to the encoding of the second mode, and further comprises an interleaver configured to interleave a plurality of neighboring blocks of the encoding data.

The first interface further comprises a scrambler configured to scramble the one merged signal.

Further comprising a buffer provided between the signal input receiver and the packetizer, and configured to store the first signal input to the signal input receiver.

The plurality of decoders comprises a first decoder configured to perform decoding corresponding to the first mode with respect to the rearranged data of the first signal, and the display apparatus further comprises a controller configured to generate the sync signal and a valid signal indicating a valid section for the rearranged data of the first signal, and control the first decoder to perform decoding with respect to the rearranged data of the first signal based on the generated sync and valid signals.

According to another embodiment of the disclosure, there is provided a method of controlling a display apparatus, comprising: receiving a plurality of signals which are different in kind from each other; with a plurality of encoders provided respectively corresponding to the plurality of signals, performing encoding of a corresponding mode according to the kinds of the plurality of signals; transmitting a signal obtained by serializing the encoded signal; deserializing the transmitted signal; with a plurality of decoders provided respectively corresponding to the plurality of encoders, performing decoding and restoring the deserialized signal into the plurality of signals; and with a display, displaying an image based on the plurality of restored signals.

The plurality of signals comprises a first signal comprising packet-type data, and a second signal comprising serial-type data, and the performing the encoding comprises performing encoding based on a first mode having a first error correction capacity with respect to the first signal, and performing encoding based on a second mode having a second error correction capacity lower than the first error correction capacity with respect to the second signal.

The performing the encoding based on the first mode comprises rearranging data of the first signal to correspond to the first mode of a first encoder.

The first signal comprises a sync signal, and the rearranging comprises allowing the rearranged data of the first signal to comprise sync information to indicate a position of the sync signal.

Further comprising outputting one merged signal into which the first signal encoded by the first mode of a first encoder and the second signal encoded by the second mode of a second encoder are merged.

The performing the encoding based on the second mode comprises: outputting encoded data in units of blocks having the number of bits corresponding to the encoding of the second mode; and interleaving a plurality of neighboring blocks of the encoding data.

Advantageous Effects

Therefore, according to the disclosure, there are provided a display apparatus and a method of controlling the same, in which a forward error correction (FEC) technique is applied corresponding to characteristics of signals, thereby guaranteeing stability of a signal and preventing an erroneous correction of a signal.

BEST MODE

Figure 1:
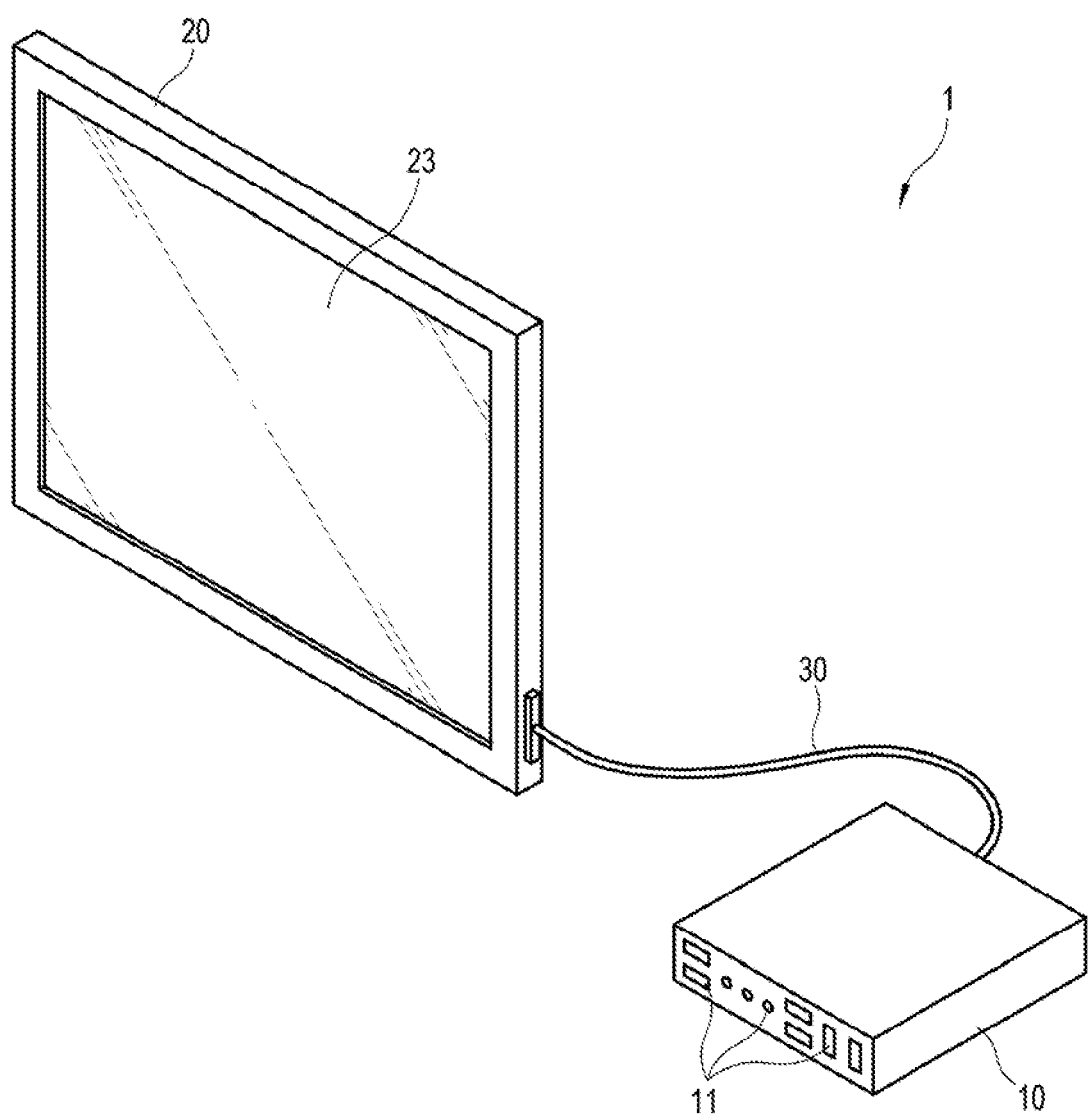
FIG. 1 illustrates a display apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same function. In the disclosure, at least one among a plurality of elements refers to not only all the plurality of elements but also both each one of the plurality of elements excluding the other elements and a combination thereof.

FIG. 1 illustrates a display apparatus according to an embodiment of the disclosure. As shown in FIG. 1, the display apparatus 1 according to this embodiment may include a first device 10 configured to receive various kinds of signals from an external apparatus, and a second device 20 configured to process and display a signal. The first device 10 and the second device 20 may be physically separated, and the display apparatus 1 may further include a cable 30 to connect the first device 10 and the second device 20. The cable 30 may be embodied by a high-speed communication channel, so that the first device 10 can transmit the plurality of signals to the second device 20 through the cable 30 at high speed. Data to be transmitted to the high-speed interface system including the first device 10, the second device 20, and the cable 30 may include various control data as well as video and audio data.

In particular, the data to be transmitted to the high-speed interface system may be classified into data gathered and transmitted in units of packet and data transmitted in units of bits or bytes. In this case, the first device 10 and the second device 20 may perform signal processing processes respectively corresponding to different kinds of data signals.

For example, in case of an encoding/decoding process, the first device 10 may use a forward error correction (FEC) code having a high error correction capacity to encode packet-type data like a high definition multimedia interface (HDMI) signal, but may use an FEC code having a relatively low error correction capacity to encode serial-type data like a universal serial bus (USB) signal.

When the encoded signal is transmitted to the second device 20 at high speed, the second device 20 may also perform FEC decoding corresponding to each of the HDMI signal and the USB signal. An FEC decoding process includes a process of correcting an error that occurs during the high-speed transmission and restoring each signal.

Like this, when the image processing process is carried out by considering the kinds of signals to transmit the signals at high speed, it is possible to guarantee the stability of each signal with regard to an error that occurs during a high-speed transmission process and lower probability of erroneous correction that occurs during a restoring process as compared with those of when a batch signal-processing process is carried out.

Below, the elements of the display apparatus 1 will be described in detail with reference to FIG. 2.

Figure 2:
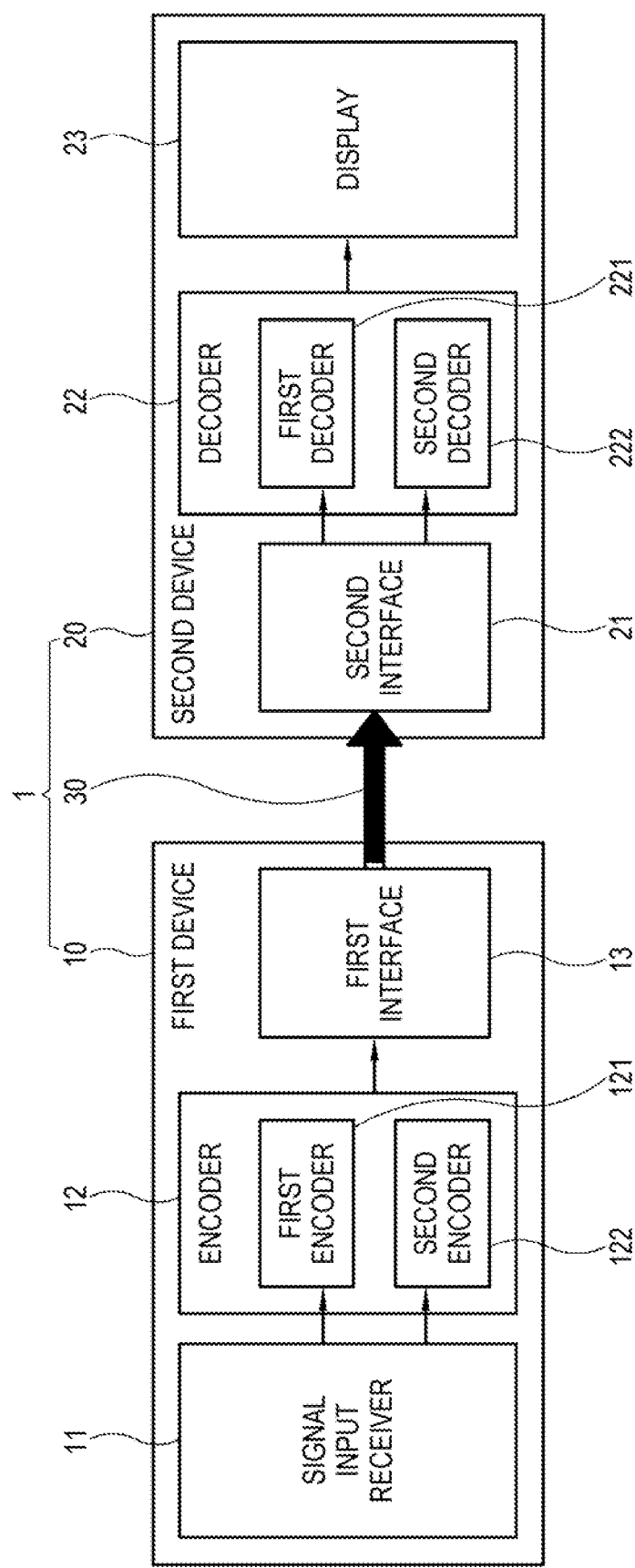
FIG. 2 is a block diagram of the display apparatus in FIG. 1.

FIG. 2 is a block diagram of the display apparatus in FIG. 1. As shown in FIG. 2, the first device 10 and the second device 20 of the display apparatus 1 are physically separated, and connected through the cable 30. The first device 10 may include a signal input receiver 11, a encoder 12, and a first interface 13, and the second device 20 may include a second interface 21, a decoder 22, and a display 23.

The signal input receiver 11 of the first device 10 may receive different kinds of signals from external apparatuses. The external apparatus may be embodied by any apparatus, which can be connected to the display apparatus and provide a signal, like an HDMI apparatus, a USB apparatus, a set-top box, an audio system, a digital versatile disc (DVD) player, a Blu-ray player, a personal computer (PC), etc. without limitations.

The signal input receiver 11 may include various input interfaces to receive signals from the external apparatuses. For example, the HDMI interface, the USB interface, Audio/Video and COMPONENT interfaces, interfaces for headphones or optical inputs, a tuner interface, and a local area network (LAN) interface.

The encoder 12 may perform the FEC encoding suitable for each of at least one signal input to the signal input receiver 11. To this end, a plurality of encoders 12 may be provided respectively corresponding to the kinds or types of signals.

For example, it will be assumed below that a signal including serial-type data in units of bits or bytes and a signal including packet-type data relatively longer than the bits or bytes are input at the same time. Here, the error correction capacity for the signal including the serial-type data may be lower than the error correction capacity for the signal including the packet-type data.

Among the plurality of encoders, a first encoder 121 may consider error correction capacity for a first signal having the packet-type data, for example, use a Reed-Solomon code or the like block code to thereby perform the FEC encoding. A second encoder 122 may consider error correction capacity for a second signal having the serial-type data, for example, use a hamming code to thereby perform the FEC encoding. However, there are no limits to an FEC encoding mode, and thus various FEC codes may be used to perform the FEC encoding suitable for an input signal.

The first interface 13 is configured to serialize a signal encoded by the encoder 12, and transmit the serialized signal to the second interface 21 of the second device 20 at high speed. The cable 30 used at the high-speed transmission may be provided as an easily extended line. Therefore, the first device 10 and the second device 20 may be arranged freely leaving a distance.

Meanwhile, the second device 20 may include the second interface 21, the decoder 22, and the display 23. The second interface 21 may be configured to deserialize the signal received from the first interface 13 through the cable 30.

The decoders 22 are provided respectively corresponding to the plurality of encoders, and configured to decode the deserialized signal to thereby restore the signal. For example, a first decoder 221 may be provided corresponding to the first encoder 121 using the RS code to perform the FEC encoding, and restore the encoded first signal with the RS code. A second decoder 222 may be provided corresponding to the second encoder 122 using the hamming code to perform the FEC encoding, and restore the encoded second signal with the hamming code.

The display 23 may be configured to display an image based on the signal restored by the decoder 22. The display 23 may be embodied by various types such as a plasma display panel (PDP), a liquid crystal display (LCD), a light emitting diode (LED), an organic light emitting diode (OLED), a flexible display, etc. without limitations.

As necessary, the second device 20 may perform additional signal processing processes such as de-interlacing, scaling, noise reduction, detail enhancement, etc. as well as the foregoing signal processing process. To this end, the second device 20 may further include a signal processor. The signal processor may be embodied by a system-on-chip (SoC) where various signal processing processes are integrated, or a board to which individual elements for independently performing signal processing processes are mounted.

Below, the signal processing processes corresponding to the kinds of signals will be described in detail with reference to FIG. 3.

Figure 3:
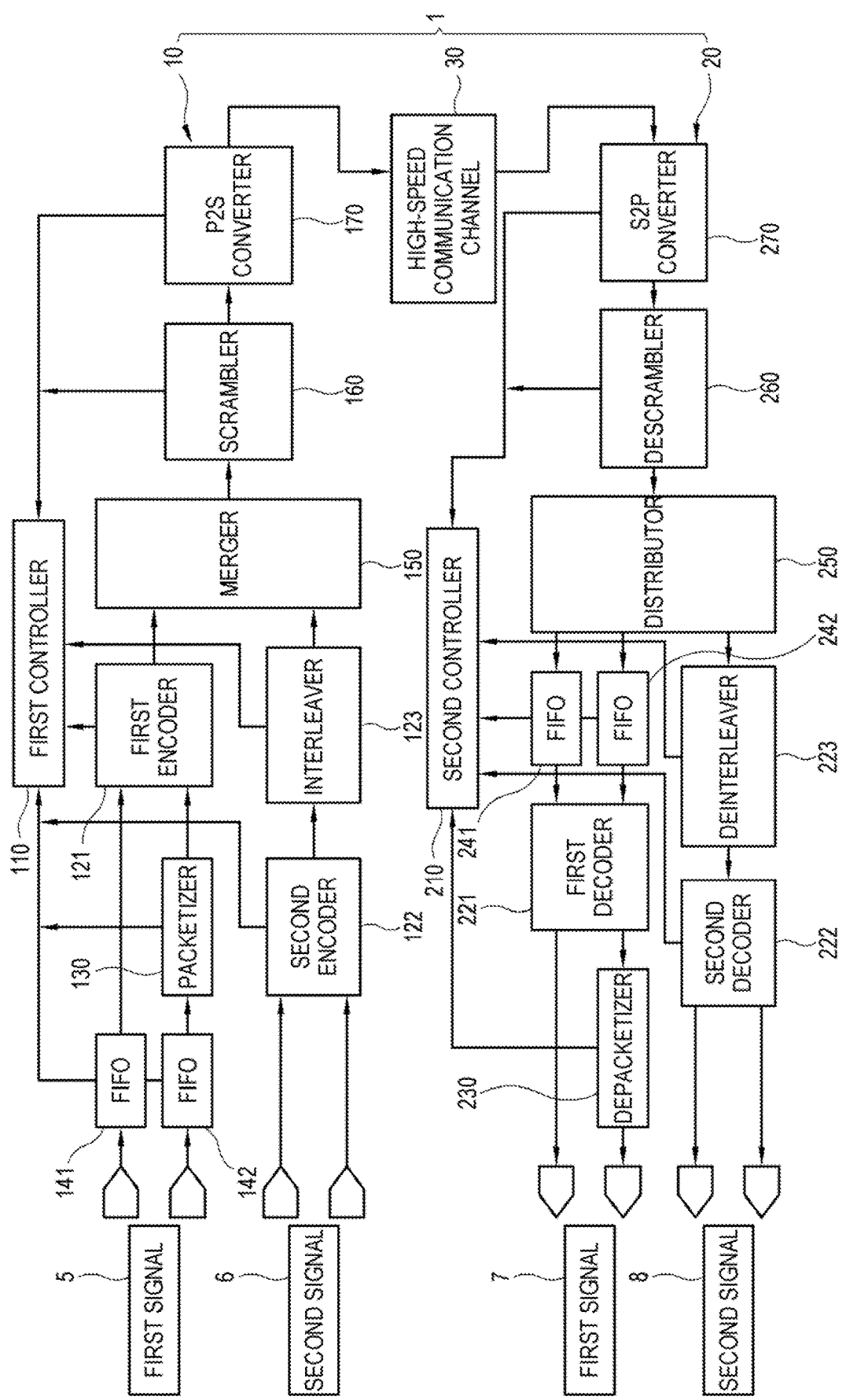
FIG. 3 is a circuit diagram of the display apparatus in FIG. 2.

FIG. 3 is a circuit diagram of the display apparatus in FIG. 2. As shown in FIG. 3, it will be assumed that at least one signal input to the display apparatus 1 includes a first signal 5 having the packet-type data and a second signal 6 having the serial-type data according to the types. For example, the first signal 5 may be a signal input through the HDMI, and the second signal 6 may be a signal input through the USB. However, there are no limits to the types or numbers of input signals, and thus two or more signals having various types of data may be input.

Here, the first signal 5 and the second signal 6 may be input and processed at the same time. For reference, although descriptions about the signal processing processes for the two signals 5 and 6 are made in sequence, the processes for the two signals 5 and 6 may be performed in parallel.

First, the FEC encoding process for the first signal 5 having the packet-type data will be described. When the first signal 5 is input to the signal input receiver 11, the first signal 5 may be temporarily stored in first-in-first-outs (FIFO) 141 and 142. This is to gather the data in units of a predetermined packet, and the FIFOs 141 and 142 may be embodied by a buffer.

The first controller 110 may control general elements of the first device 10. For example, the first controller 110 may control the FIFOs 141 and 142 to receive and output data of a predetermined size. The first controller 110 may include a control program (or instruction) for performing control with regard to general elements of the first device 10, a nonvolatile memory in which the control program is installed, a volatile memory in which at least a part of the installed control program is loaded, and at least one processor or central processing unit (CPU) for executing a loaded control program. Further, such a control program may be stored in any device other than the first device 10.

The control program may include a program(s) actualized in the form of at least one among a basis input/output system (BIOS), a device driver, an operating system, a firmware, a platform, and an application. According to an embodiment, the application may be previously installed or stored when the electronic apparatus 100 is manufactured, or may be installed based on application data received from the outside when it is used in the future. The application data may for example be downloaded from an application market and the like external server. Such an external server is an example of a computer program product, but not limited to this example.

The output terminals of the FIFOs 141 and 142 are connected to the first encoder 121 for performing the FEC encoding for the first signal 5. The first encoder 121 may use the FEC code suitable for the packet-type data or the like data having a relatively high error correction capacity, thereby carrying out the FEC encoding with respect to the first signal 5. For example, the first encoder 121 may use the RS code to thereby add an error code to the first signal having the packet-type data.

Like this, when the FEC code is added at the output terminals of the FIFOs 141 and 142, a clock speed becomes higher as much as increment of a data rate based on the addition of the error code, and it is thus advantageous to easily secure time to add the error code.

Here, when the first encoder 121 uses the FEC code to perform the FEC encoding, it is required that input data has a specific format corresponding to the FEC code. When the data of the first signal 5 corresponds to the specific format, the first signal 5 is subjected to the FEC encoding by the first encoder 121. When the data of the first signal 5 does not correspond to the specific format, a process for packetizing the first signal 5 may precede the FEC encoding. The packetizing process refers to a process that a packetizer 130 rearranges the data of the first signal 5 to correspond to the specific format. Details of the packetizing process will be described later with reference to FIG. 4.

Next, the FEC encoding process for the second signal 6 having the serial-type data will be described. Unlike the packet-type data, the serial-type data is not stored in the FIFOs 141 and 142 configured to gather data in units of a packet.

When the second signal 6 having the serial-type data is input, the second signal 6 is encoded by the second encoder 122. Because the second signal 6 has an error correction capacity lower than that of the first signal, the second signal 6 is subjected to the FEC encoding with, for example, the hamming code, and output as the encoding data in units of a block having a predetermined number of bits.

The encoding process for the serial-type data may include an interleaving process. The encoded data is interleaved by an interleaver 123 and spreads neighboring pieces of data apart as much as a predetermined time interval. This is to disperse an error into pieces of data which are not neighbored, and make the error be within the range of the error correction capacity of the FEC code at the decoding.

Like this, when the serial-type data is encoded using a code having a low error correction capacity, it is advantageous to prevent a delay of a signal processing time for the data.

A merger 150 is configured to merge the first signal encoded by the first encoder 121 and the second signal encoded by the second encoder 122 into one signal and output the merged signal.

Further, the data of the merged signal may be randomized by a scrambler 160. When the FEC encoding for the signals 5 and 6 is performed at the output terminal of the scrambler 160, randomized characteristics may be deteriorated. Therefore, it is preferable that the FEC encoding is performed at the output terminal of the FIFOs 141 and 142.

The scrambled merged signal is serialized by a parallel-to-serial (P2S) converter 170 for serial transmission, and the serialized signal is transmitted to the second device 20 through a high-speed communication channel 30.

The serialized signal received through the high-speed communication channel 30 is deserialized by a serial to parallel (S2P) converter 270 of the second device 20, and the deserialized signal is restored into the merged signal by a descrambler 260.

A distributor 250 divides one merged signal into two signals 5 and 6 encoded by different modes, and distributes the signals 5 and 6 for the decoding processes corresponding to the signals 5 and 6.

First, the decoding process for the first signal 5 having the packet-type data will be described. The encoded first signal 5 is temporarily stored in the FIFOs 241 and 242. The FIFOs 241 and 242 are configured to gather data in units of a predetermined packet and may be embodied by a buffer.

A second controller 210 may control general elements of the second device 20. The second controller 210 may include a control program (or instruction) for performing the control, a nonvolatile memory in which the control program is installed, a volatile memory in which at least a part of the installed control program is loaded, and at least one processor or CPU for executing a loaded control program. Further, such a control program may be stored in any device other than the second device 20. For example, the second controller 210 controls the FIFOs 241 and 242 to receive and output data of a predetermined size.

At the output terminals of the FIFOs 241 and 242, the first decoder 221 is provided to perform the FEC decoding for the first signal 5. The first decoder 221 may perform the FEC decoding for the packet-type data. For example, the first decoder 221 may detect an error, which occurs during the transmission, with reference to the RS code or the like added error code, and correct the detected error. The first decoder 221 may output a first signal 7 having data of which an error is corrected.

Here, the first signal 5, of which the data is rearranged by the packetizer 130 to have the specific format, is restored to have the first input format by the depacketizer 230, and output as the first signal 7.

Next, the FEC decoding process for the second signal 6 having the serial-type data will be described. Unlike the packet-type data, the serial-type data is not stored in the FIFOs 241 and 242 that gathers data in units of a packet.

Prior to the decoding process for the serial-type data, a deinterleaving process is performed. The deinterleaving process refers to a process of a deinterleaver 223 to recover neighboring pieces of data spread apart as much as a predetermined time interval.

The second decoder 222 may perform the FEC decoding for the deinterleaved data. For example, the second decoder 222 may detect an error, which occurs during the transmission, with reference to the hamming code or the like added error code, and correct the detected error. The second decoder 222 may output a second signal 8 having data of which an error is corrected.

Thus, when the FEC codes are selected and applied corresponding to the types of data, data can be more rapidly and stably transmitted than that based on batch selection and application of the FEC coding.

Further, when the FEC coding is selectively reinforced in consideration of the transmission limit capacity of the high-speed communication channel 30, it is possible to not only differentially give stability according to data but also guarantee the stability of the whole high-speed interface system. In other words, the FEC code with the strengthened FEC decoding capacity is selected and applied for data having high importance, and therefore accuracy and completeness of error correction are secured with regard to the data having the high importance, thereby guaranteeing the stability of the whole high-speed interface system.

Below, a packetizing process, in which the packet-type data is rearranged by the packetizer 130, will be described with reference to FIG. 4.

Figure 4:
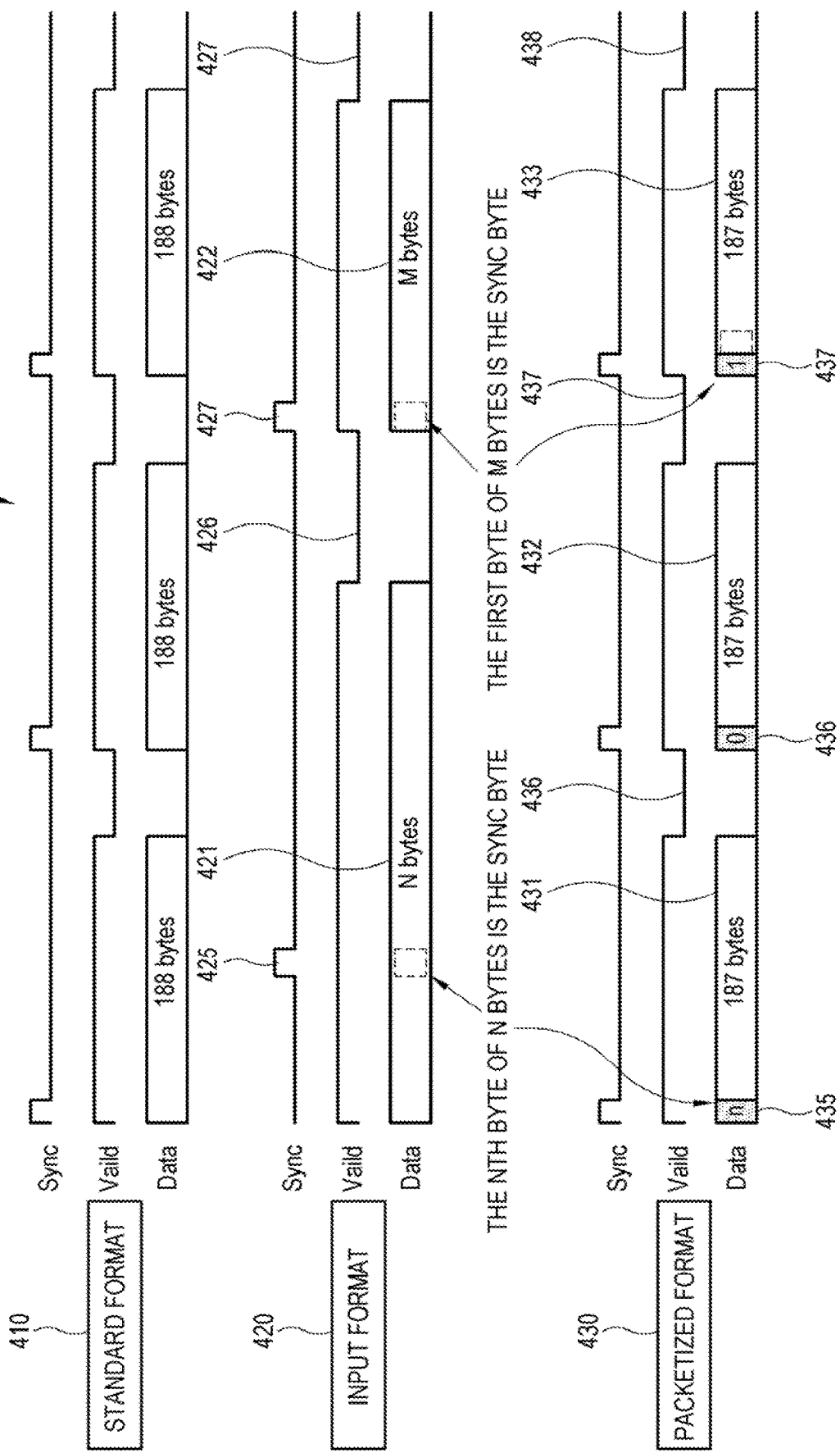
FIG. 4 illustrates a packetizing process of packet-type data.

FIG. 4 illustrates a packetizing process of packet-type data. To perform the FEC encoding for packet-type input data, the packet-type input data is required to have a format matching a standard format 410 of the FEC code. When an input format 420 of the input data does not match the standard format 410, the packetizer 130 performs rearrangement so that the input format 420 can be changed into a packetized format 430 matching the standard format 410, and then performs the FEC encoding for the input data.

In case of the FEC encoding using the RS code, it will be assumed as shown in FIG. 4 that the standard format 410 is given in units of 188 bytes but input data 421 has the input format 420 given in units of predetermined N bytes greater than 188 bytes.

The N-byte data 421 is packetized by the packetizer 130 into data in 187 bytes. In other words, the first 187 bytes of the N-byte data 421 are packetized into first data 431, and the second 187 bytes are packetized into second data 432.

Further, a sync signal 425 of the N-byte data 421 is reflected to the packetized data 431 and 432 as sync information. Because the nth byte of the N-byte data 421 is the sync byte corresponding to the position of the sync signal, the first byte of the first data 431 is added with the sync information about that the nth byte of the N-byte data 421 is the sync byte. In other words, the nth sync byte of N-byte data 421 is not greater than 187 bytes, and therefore it is reflected to the sync information of the first 187 bytes, i.e. the first data 431. On the other hand, the first byte of the second 187 bytes, i.e. the second data 432 may be added with the sync information about that there are no sync bytes.

Next, it will be assumed that M-byte data 422 is input. The M-byte data 422 is packetized by the packetizer 130 into third data 433 in 187 bytes. Because the first byte of the M-byte data 422 is the sync byte and not greater than 187 bytes, the first byte of the third data 433 is added with the sync information about that the first byte of the M-byte data 422 is the sync byte.

Like this, the packetizer 130 performs rearrangement so that the input format 420 can be changed into the packetized format 430 matching the standard format 410, and then performs the FEC encoding for the input data.

Below, it will be described that an error occurs even in the valid signals 436, 437 and 438 and the sync signal having the packetized format 430 during the transmission.

The sync signal and the valid signals 436, 437 and 438 are added to each of the first data 431 and the second data 432, and the third data 433 rearranged through the packetizing process, and transmitted to the second device 20 at high speed. However, an error may occur even in the sync signal and the valid signals 436, 437 and 438 during the transmission, and such an error may result in erroneous correction with regard to the whole transmitted data.

To prevent erroneous correction of the whole, the second device 20 may separately regenerate the sync signal and the valid signals 436, 437 and 438 and use them at the FEC decoding process. That is, the second controller 210 may control the size of the data packet output from the FIFOs 241 and 242 based on information about the size of the data packet having the packetized format 430, and regenerate the sync signal and the valid signals 436, 437 and 438 corresponding to the beginning and the ends of the data.

Referring back to FIG. 4, the second controller 210 may obtain information about the sync signal every 188 bytes of the packetized format 430 and the valid signals maintained corresponding to 188 bytes, or for 188 bytes. Further, based on the obtained information, the FIFOs 241 and 242 of the second device 20 are configured to output the data after gathering the data as much as 188 bytes, and generate the sync signal and the valid signals corresponding to the beginning and the ends of the data.

Like this, when the second device 20 separately generates the sync signal and the valid signals 436, 437 and 438 and uses them at the FEC decoding process, it is possible to prevent the erroneous correction of the whole data due to an error that occurs in the sync signal and the valid signals 436, 437 and 438 of the packetized format 430 during the transmission.

Below, an encoding process for the serial-type data will be described in detail with reference to FIG. 5.

Figure 5:
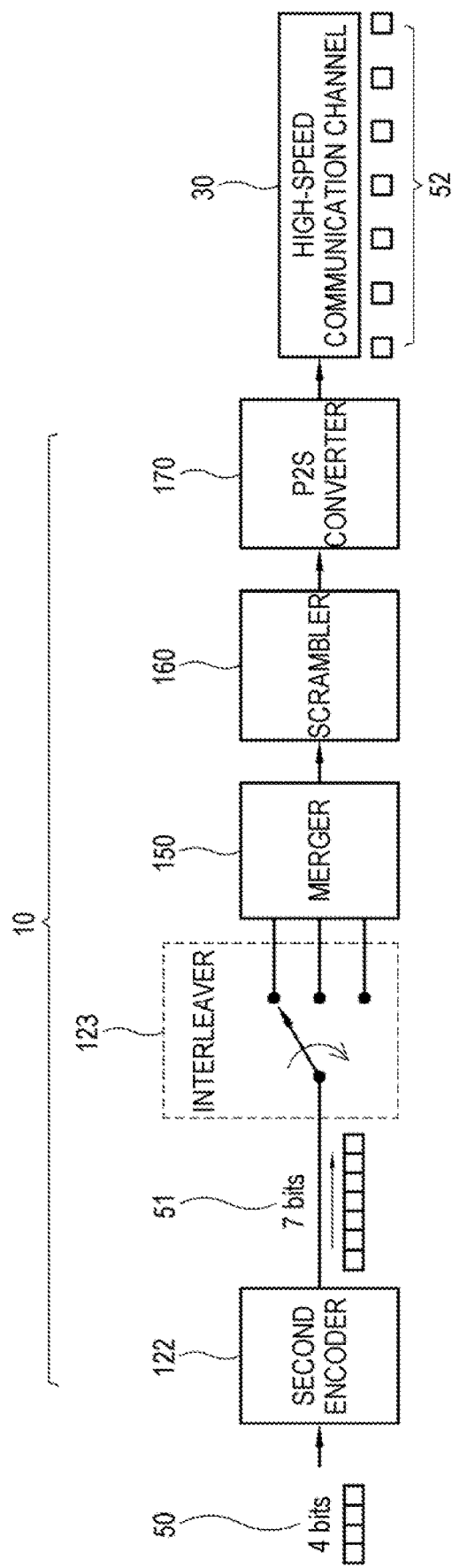
FIG. 5 illustrates an encoding process for serial-type data with a hamming code.

FIG. 5 illustrates an encoding process for serial-type data with a hamming code. As shown in FIG. 5, the second encoder 122 uses the (7.4) hamming code for the serial-type data of 4 bits, thereby outputting data of 7 bits added with three parity bits.

The data of 7 bits is interleaved by the interleaver 123, and thus each bit is separated from its neighboring bits by a predetermined time interval. Further, the interleaved data of 7 bits and the first signal 5, which is encoded by the first encoder 121, are merged and output as one merged signal by the merger 150, randomized by the scrambler 160, serialized by the P2S converter 170, and transmitted to the second device 20 through the high-speed communication channel 30 at high speed.

Like this, when the (7.4) hamming code having a low error correction capacity is performed to encode the serial-type data of 4 bits, it is advantageous to prevent a delay of processing time for the data of 4 bits.

Figure 6:
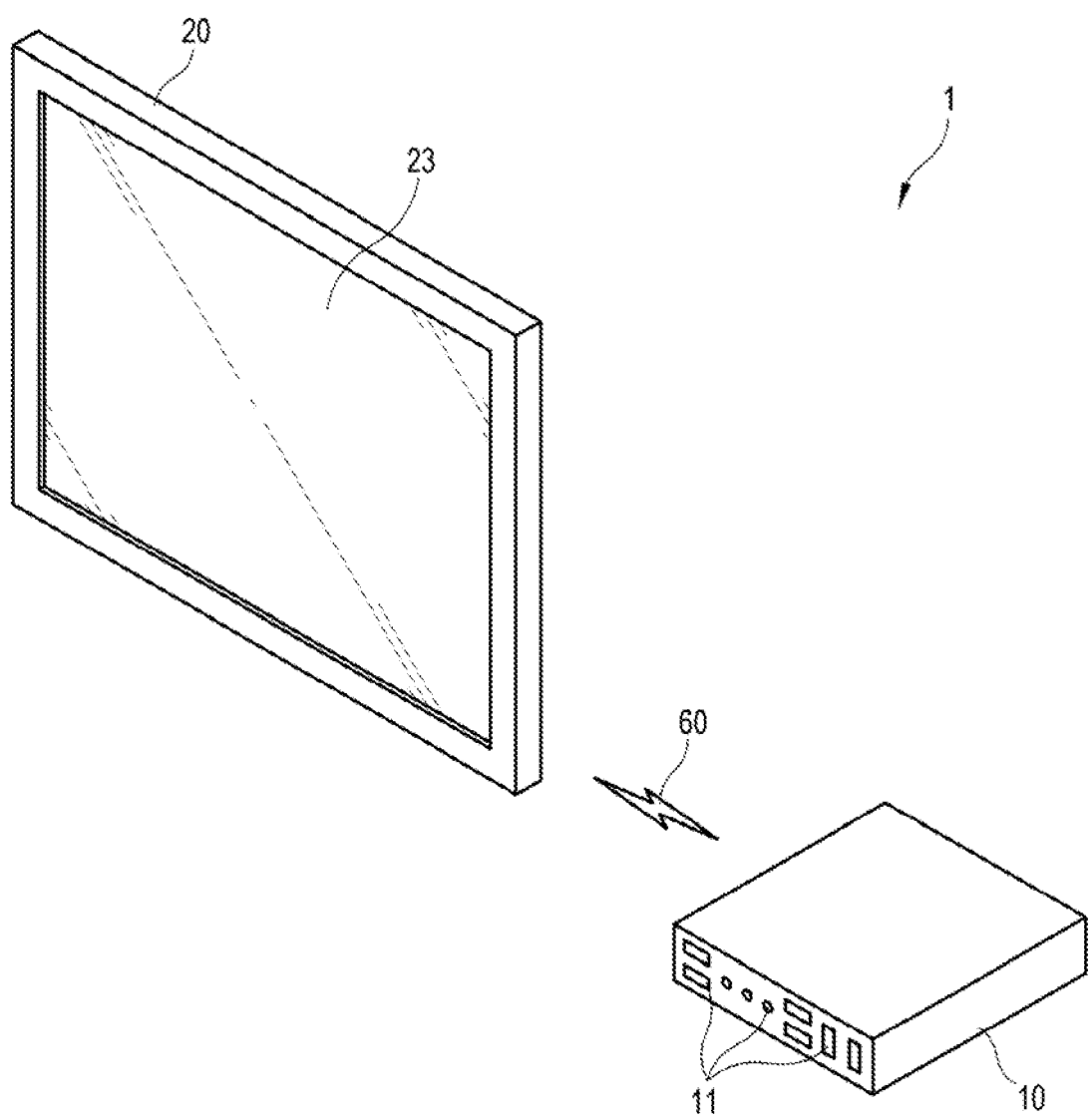
FIG. 6 illustrates a display apparatus according to another embodiment.

FIG. 6 illustrates a display apparatus according to another embodiment. The first device 10 and the second device 20 of the display apparatus 1 shown in FIG. 6 respectively correspond to the first device 10 and the second device 20 of FIG. 1, and thus descriptions will be made avoiding repetitive descriptions and focusing on difference.

As shown in FIG. 6, the first device 10 and the second device 20 can wirelessly communicate with each other at high speed. To this end, each of the devices 10 and 20 may include a wireless communicator configured to perform high-speed wireless communication based on predetermined wireless standards. There are no limits to the wireless standards used by each wireless communicator, and therefore wireless high definition (WiHD), wireless gigabit alliance (WiGig), etc. may for example be used.

The first device 10 may receive various kinds of signals received from an external apparatus, perform encoding matching data types of a signal, and transmit the encoded data to the second device 20 by the high-speed wireless communication. Therefore, the display apparatus 1 according to this embodiment of the disclosure does not need to use the cable 30 like the display apparatus 1 of FIG. 1, and is thus further free from a distance restriction between the first device 10 and the second device 20.

Figure 7:
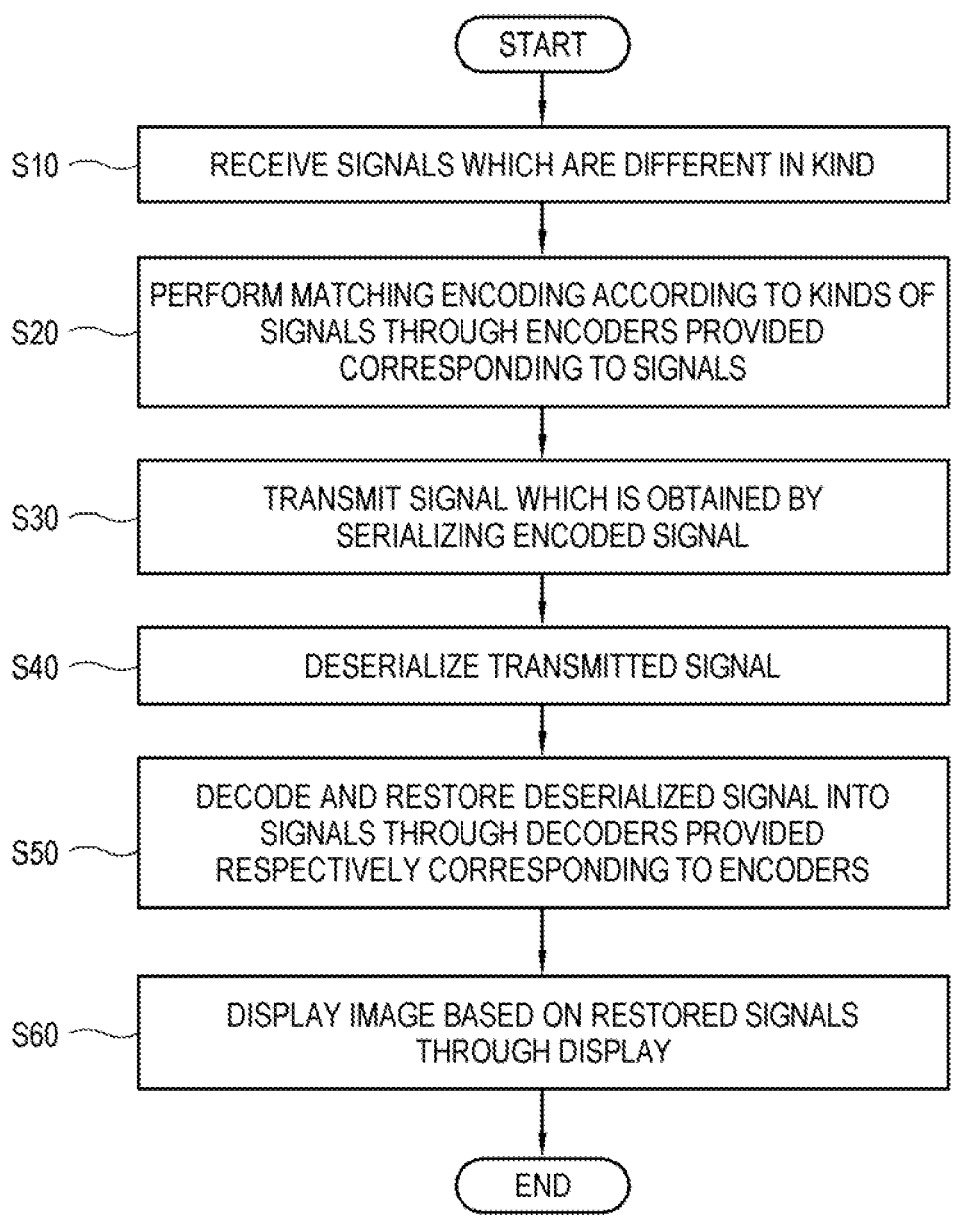
FIG. 7 is a flowchart of controlling the display apparatus in FIG. 1.

FIG. 7 is a flowchart of controlling the display apparatus in FIG. 1. As shown in FIG. 7, first, the display apparatus 1 receives a plurality of signals which are different in kind (S10), and performs matching encoding according to the kinds of signals through the plurality of encoders 121 and 122 provided respectively corresponding to the plurality of signals (S20).

The display apparatus 1 transmits a signal, which is obtained by serializing the encoded signal, through the first interface 13 (S30), and deserializes the signal, which is received from the first interface 13, through the second interface 21 (S40).

The display apparatus 1 decodes and restores the deserialized signal into the plurality of signals through the plurality of decoders 221 and 222 provided respectively corresponding to the plurality of encoders 121 and 122 (S50). Further, the display apparatus 1 displays an image based on the plurality of restored signals through the display 23 (S60).

Although the content and merits have been described with reference to specific embodiments and drawings, the content and scope of the disclosure are not limited to the specific embodiments and drawings. It will be appreciated by a person having ordinary skill in the art that various changes can be made without departing from the scope of the disclosure in appended claims. The detailed descriptions and drawings of the disclosure are for illustrative purpose only, and various modified embodiments are also construed as being included in the scope of the disclosure.

The invention claimed is:

1. A display apparatus comprising:
a signal input receiver configured to receive a plurality of signals comprising a first signal and a second signal, kinds of the first signal and the second signal being different from each other;
a plurality of encoders provided respectively corresponding to kinds of the plurality of signals, and configured to perform encoding of the plurality of signals by adding error codes into the plurality of signals, the error codes corresponding to the kinds of the plurality of signals and being different from each other, wherein the plurality of encoders include a first encoder configured to perform a first encoding of the first signal by adding a first error code into the first signal and a second encoder configured to perform a second encoding of the second signal by adding a second error code into the second signal;
a first interface configured to transmit a signal obtained by serializing the encoded plurality of signals;
a second interface configured to deserialize the obtained signal received from the first interface;
a plurality of decoders provided respectively corresponding to the kinds of the plurality of signals, and configured to perform decoding by restoring the deserialized signal into the plurality of signals, detecting and correcting errors of the plurality of signals based on the added error codes; and a display configured to display an image based on the plurality of signals of which errors are corrected, wherein the first error code has a first error correction capacity and the second error code has a second error correction capacity lower than the first error correction capacity, and wherein the first signal comprises packet-type data, and the second signal comprises serial-type data.

2. The display apparatus according to claim 1, wherein the first encoder is configured to perform encoding based on a first mode having the first error correction capacity with respect to the first signal, and the second encoder is configured to perform encoding based on a second mode having the second error correction capacity lower than the first error correction capacity with respect to the second signal.

3. The display apparatus according to claim 2, further comprising a packetizer provided between the signal input receiver and the first encoder, and configured to rearrange data of the first signal to correspond to the first mode of the first encoder.

4. The display apparatus according to claim 3, wherein the first signal comprises a sync signal, and the packetizer allows the rearranged data of the first signal to comprise sync information to indicate a position of the sync signal.

5. The display apparatus according to claim 2, wherein the first interface comprises a merger configured to output one merged signal into which the first signal encoded by the first mode of the first encoder and the second signal encoded by the second mode of the second encoder are merged.

6. The display apparatus according to claim 2, wherein the second encoder outputs encoded data in units of blocks having a number of bits corresponding to the encoding of the second mode, and further comprises an interleaver configured to interleave a plurality of neighboring blocks of the encoded data.

7. The display apparatus according to claim 5, wherein the first interface further comprises a scrambler configured to scramble the one merged signal.

8. The display apparatus according to claim 4, further comprising a buffer provided between the signal input receiver and the packetizer, and configured to store the first signal input to the signal input receiver.

9. The display apparatus according to claim 4, wherein the plurality of decoders comprise a first decoder configured to perform decoding corresponding to the first mode with respect to the rearranged data of the first signal, and the display apparatus further comprises a controller configured to generate the sync signal and a valid signal indicating a valid section for the rearranged data of the first signal, and control the first decoder to perform decoding with respect to the rearranged data of the first signal based on the generated sync and valid signals.

10. A method of controlling a display apparatus, comprising:

receiving a plurality of signals comprising a first signal and a second signal, kinds of the first signal and the second signal being different from each other;

with a plurality of encoders provided respectively corresponding to kinds of the plurality of signals, performing encoding of the plurality of signals by adding error codes into the plurality of signals, the error codes corresponding to the kinds of the plurality of signals and being different from each other, wherein the performing the encoding of the plurality of signals includes performing, by a first encoder of the plurality of encoders, a first encoding of the first signal by adding a first error code into the first signal and performing, by a second encoder of the plurality of encoders, a second encoding of the second signal by adding a second error code into the second signal;

transmitting a signal obtained by serializing the encoded plurality of signals;

deserializing the transmitted signal;

with a plurality of decoders provided respectively corresponding to the kinds of the plurality of signals, performing decoding by restoring the deserialized signal into the plurality of signals, detecting and correcting errors of the plurality of signals based on the added error codes; and with a display, displaying an image based on the plurality of signals of which errors are corrected, wherein the first error code has a first error correction capacity and the second error code has a second error correction capacity lower than the first error correction capacity, and wherein the first signal comprises packet-type data, and the second signal comprises serial-type data.

11. The method according to claim 10, wherein the performing the encoding comprises performing encoding based on a first mode having the first error correction capacity with respect to the first signal, and performing encoding based on a second mode having the second error correction capacity lower than the first error correction capacity with respect to the second signal.

12. The method according to claim 11, wherein the performing the encoding based on the first mode comprises rearranging data of the first signal to correspond to the first mode of the first encoder.

13. The method according to claim 12, wherein the first signal comprises a sync signal, and the rearranging comprises allowing the rearranged data of the first signal to comprise sync information to indicate a position of the sync signal.

14. The method according to claim 11, further comprising outputting one merged signal into which the first signal encoded by the first mode of the first encoder and the second signal encoded by the second mode of the second encoder are merged.

15. The method according to claim 11, wherein the performing the encoding based on the second mode comprises:

outputting encoded data in units of blocks having a number of bits corresponding to the encoding of the second mode; and interleaving a plurality of neighboring blocks of the encoded data.

16. The method according to claim 14, further comprising scrambling the one merged signal.

17. The method according to claim 13, further comprising storing the first signal input to a signal input receiver by a buffer provided between the signal input receiver and a packetizer.

18. The method according to claim 13, wherein the plurality of decoders comprise a first decoder configured to perform decoding of the rearranged data of the first signal corresponding to the first mode, and wherein the method further comprises generating the sync signal and a valid signal indicating a valid section for the rearranged data of the first signal and performing, by the first decoder, decoding of the rearranged data of the first signal based on the generated sync signal and the generated valid signal.

19. The display apparatus according to claim 1, wherein input interfaces of the signal input receiver comprise a high definition multimedia interface (HDMI) interface and a universal serial bus (USB) interface.

20. An electronic device comprising:
an interface configured to:
receive, from an external device, a signal obtained by encoding a plurality of signals comprising a first signal and a second signal by adding error codes into the plurality of signals, and serializing the encoded plurality of signals, the error codes corresponding to kinds of the plurality of signals and being different from each other, wherein kinds of the first signal and the second signal are different from each other, and the encoding the plurality of signals comprises a first encoding of the first signal, by a first encoder of a plurality of encoders, by adding a first error code into the first signal and a second encoding of the second signal, by a second encoder of the plurality of encoders, by adding a second error code into the second signal, and
deserialize the obtained signal received from the external device;
a plurality of decoders provided respectively corresponding to the kinds of the plurality of signals, and configured to perform decoding by restoring the deserialized signal into the plurality of signals, detecting and correcting errors of the plurality of signals based on the added error codes; and
a display configured to display an image based on the plurality of signals of which errors are corrected,
wherein the first error code has a first error correction capacity and the second error code has a second error correction capacity lower than the first error correction capacity, and
wherein the first signal comprises packet-type data, and the second signal comprises serial-type data.

* * * * *